March 18, 1958  A. J. GIRDWOOD ET AL  2,827,528

ELECTROMAGNETIC SWITCH

Filed April 28, 1955

INVENTORS
ARTHUR J. GIRDWOOD
ROBERT G. KOCH
BY
ATTORNEY

United States Patent Office 2,827,528
Patented Mar. 18, 1958

2,827,528

ELECTROMAGNETIC SWITCH

Arthur J. Girdwood and Robert G. Koch, Guelph, Ontario, Canada, assignors to Leland Electric Canada Limited, a corporation of Canada Application April 28, 1955, Serial No. 504,523

7 Claims. (Cl. 200—87)

This invention relates to improvements in circuit control mechanisms, and more particularly relates to a starting switch for a dynamo electric machine.

It is desirable when starting many types of dynamo edectric machines to employ a starting winding in addition to the main operating winding in order to increase starting torque. Such an auxiliary winding further serves to reduce excessive flow of current through the main winding with a consequent reduction in the danger of winding burn out. In the past, centrifugally operated switches have been used to connect and disconnect the starting winding at the proper time, but such switches are unreliable, require an undue amount of mechanical maintenance, and are particularly subject to arcing and pitting of electrical contacts. Relays, actuated by portions of the magnetic circuit of the dynamo electric machine for which they are adapted to control, have been used for this purpose. These relays are generally complicated in structure in order to insure fast pull out at the proper point on the dynamo electric machine's starting curve, and are not easily adaptable for use with any electrical machine. Also, such relays have a tendency to vibrate and create excessive buzzing when employed with alternating current machines, and require complex structures to reduce unwanted vibration.

It is, therefore, an object of the present invention to provide an electromagnetic mechanism for switching selected winding portions of dynamo electric machines having a magnetic circuit mechanically energized by a portion of the windings of the machine.

It is another object of the invention to provide an electromagnetic switch free from magnetically induced vibration for operating on either an A. C. or D. C. type of dynamo electric machine.

It is a further object of the invention to provide an electromagnetic switch having a small differential between the amount of magnetic field current required for opening and closing of the switch contacts.

It is yet another object of the invention to provide an electromagnetic switch for dynamo electric machines which is easy to manufacture and low in cost.

For a better understanding of the invention, together with other and further objects thereof, reference is made to the following detailed description taken in connection with the accompanying drawings, in which.

Figure 1:
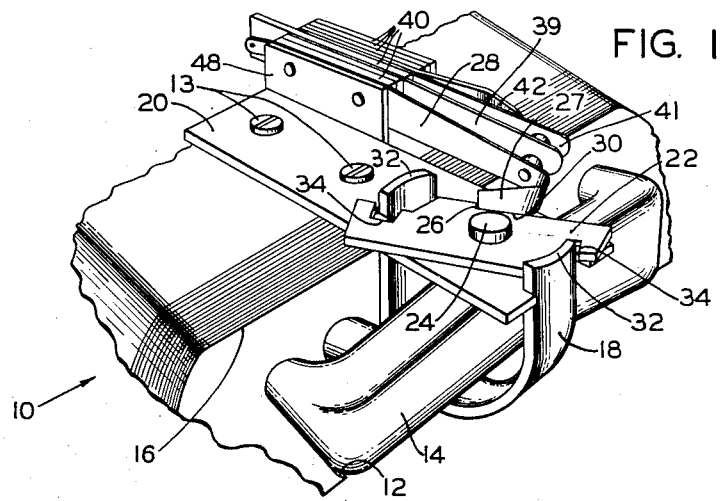
Fig. 1 is an isometric view of the invention.
Figure 2:
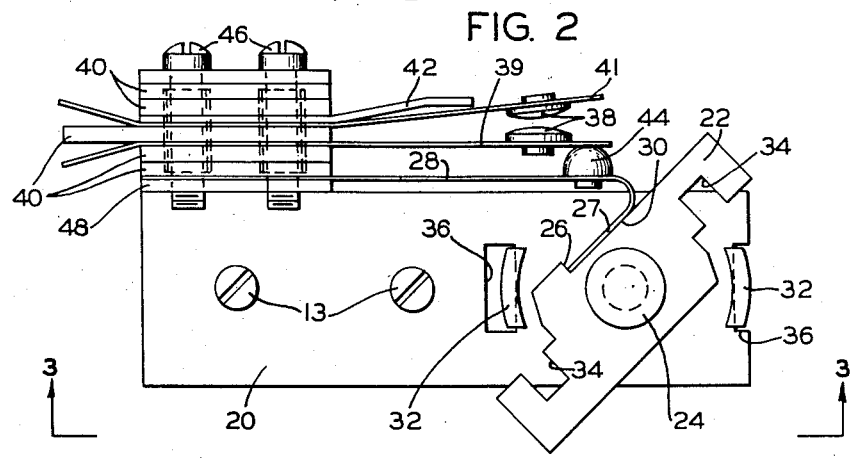
Fig. 2 is a plan view of a switch embodying the principles of the invention.

In the drawings, in Fig. 1 is shown a portion of an end of a stator for a dynamo electric machine 10 to which the switch may be adapted. The machine 10 has conventional stator slots 12 with the usual coils 14 embedded therein for producing magnetic flux.

Larger types of machines to which the invention is particularly adaptable, generally have end portions of the main winding coils extending slightly beyond the surface of the end laminations of the stator. Thus, as shown in Fig. 1, winding 14 of motor 10 extends sufficiently beyond the end lamination 16 of the stator to allow a U-shaped strap or bar 18 to partially encircle it. The open ends of strap 18 are held in position by a mounting member or bracket 20 which may be suitably fastened to the stator 12 or to some portion of the frame of motor 10 by means of suitable screws or fasteners 13. As heavy starting current passing through winding 14 induces a large magnetic flux in strap 18, no separate windings are needed for creating the required magnetic field.

Figure 3:
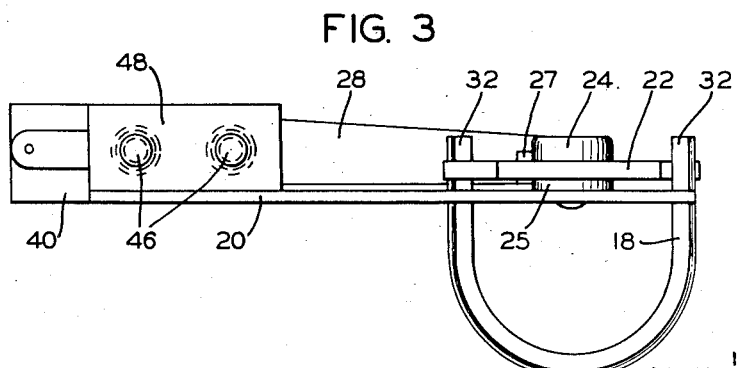
Fig. 3 is a side elevation of the switch as seen from line 3—3 of Fig. 2.

An armature 22 is provided which is pivotally mounted to bracket 20 by a suitable pin 24 intermediate the ends of the armature and spaced therefrom by spacer 25 (Fig. 3). Armature 22 is adapted to rotate about pin 24 when a current passes through winding 14. Armature 22 has a projection or notched portion 26 along one longitudinal edge which forms a stop for receiving and securing the shorter end 27 of bent leaf spring 28. Spring 28 may be formed from any resilient strip material which is capable of having a portion thereof bent back upon itself so as to lie along the edge 30 of armature 22 and be held securely in position by projection 26. Armature 22 has slots 34 near each end thereof which are spaced so as to receive the end portions 32 of strap 18 when the armature is rotated about pivot pin 24.

It is desirable in motor starting switches that the contacts break immediately when the motor has reached that point on its starting curve where the starting windings should be disconnected. In the present invention fast action between the making and breaking of the relay contacts is assured by correlating the torque curve of the armature 22 with that of the spring 28 so that there is only a small differential existing between them. A correspondingly small differential then exists in the amount of current supplied by winding 14 for setting up a magnetic field in strap 18 which actuates armature 22.

To provide this torque, slots 34 are shaped and contoured so that the gap in the magnetic path between end portions 32 and armature 22 is variable and decreases as armature 22 rotatably progresses towards engagement of the slots 34 with the end portions. Any desired configurations of the slots may be used which will insure a small differential between making and breaking of the switch contacts. For example, the armature slots 34 shown in the drawings have their length divided into a square portion and a somewhat curved portion whereby the magnetic reluctance is decreased and armature torque increased to counter the increased spring force, as armature 22 progresses towards its closed position. The end portions 32 of magnetic strap 18 are curved in a concave fashion to properly cooperate with the shaped slots 34. Strap 18 may be channeled near the end portions 32 so that it may be sprung or snapped into a firmly held position in engagement with the walls of slots 36 in member 20, when the end portions 32 are passed therethrough.

It is understood that the armature may be made to actuate any of a number of conventional contact arrangements. For purposes of illustration, a single pair of normally open contacts are shown. These contacts may be connected in series with a conventional auxiliary starting winding and associated circuit on the dynamo electric machine so that the starting winding is energized when the contacts are closed during periods of high starting current. Of course, for some starting circuit applications, the contacts may be a conventional, normally closed type which are adapted to open during periods of heavy armature current.

Contacts 38 are fastened near the ends of a pair of resilient strips 39, 41, which are in turn spaced from each other and spring 28 by suitable insulating members 40. A spring stop or backing member 42 is mounted adjacent to the outer strip 41 so as to provide positive closing and a wiping action between the contacts, since strip 41 tends ot bend around the end of backing member 42 as pressure from armature 22 increases. A suitable insulating spacer 44 is secured near the bent end of spring 28 to urge contacts 38 into engagement with each other, thereby connecting the starting winding to a source of power when armature 22 is rotated towards the ends 32 of bar 18. The leaf contacts 38, insulating spacer 40 and backing member 42 are secured to upright tab portion 48 of insulating strip 20 by means of bolts, rivets or other suitable fastenings 46. When motor 10 is in a running condition, only a relatively small current is carried by the main windings 14. Therefore, armature 22 is in an open or passive position, and the starting windings are de-energized.

During running periods, the relatively low alternating current carried by windings 14 is sufficient to cause armature 22 to vibrate slightly in accordance with the A. C. voltage cycle so that an annoying buzzing is capable of being generated. However, such noise is effectively eliminated and vibration reduced to a negligible amount by the damping action provided by the pressure of the bent back portion of spring 28 against edge 30 of armature 22. All tendency of armature 22 to vibrate is absorbed by spring 28.

In operation, a heavy current passes through windings 14 when power is applied to the motor for starting purposes. This surge of current induces a large magnetic flux through U-shaped strap 18 which causes armature 22 to rotate inwardly towards end portions 32 to close the gap therebetween. Consequently, spring 28 is urged laterally against contacts 38, causing them to close with a positive action. As pressure is applied to spring 28 by armature 22, the resulting wedging action of spring 28, as its free end tends to straighten up, increases the pressure between contacts 38 and desirably reduces the contact resistance.

Since the pull-in torque curve of armature 22 has been selectively shaped, the differential existing between the amount of current flowing in windings 14 and required to close and open contacts 38 is small. As soon as the motor reaches the desired point in its operating curve where the starting current has decreased appreciably, to which point the torque curve of armature 22 may be correlated, the contacts are opened and the starting winding connected thereto is disconnected from the source of power, allowing the motor to reach final operating speed in normal fashion.

Although for purposes of illustration the invention has been described in combination with an A. C. machine, yet the switch may be used with any type of dynamo electric machine, whether A. C. or D. C., as long as a portion of a winding carrying heavy starting currents is available for providing the current for creating the magnetic operating flux of the switch. In D. C. machines the switch would be actuated by armature current which requires either a mounting on the rotating portion of the machine or in some other convenient portion of the armature circuit where its heavy starting current may be properly utilized.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

We claim:

1. A magnetic control device for starting a dynamo electric machine having a main operating winding and a starting winding comprising a core of magnetic material partially surrounding a portion of said main windings and adapted to set up a magnetic field when current passes through said windings, said core having a pair of outwardly extending poles, an armature member pivotally mounted intermediate the ends thereof and rotatably operable to vary the magnetic field set up between said poles, a leaf spring for biasing said armature away from said poles, said leaf spring having a portion bent back upon itself, the smaller end of said bent portion of said spring being pivotally connected to an edge of said armature whereby said spring urges said armature away from said poles, said armature ends having slots therein adapted to rotatably receive said outwardly extending poles, said slots having selectively shaped contours to provide a variable magnetic force between said poles and said armature during rotation of said armature ends towards said poles so that the differential between the armature pulling torque of said field and opposing torque of said spring is substantially constant throughout the path of travel of said armature, and contacts for operatively connecting said starting winding resiliently mounted adjacent said spring and adapted to be urged into an operative position by movement of said spring away from said poles.

2. A magnetic control device for starting a dynamo electric machine having a main operating winding and a starting winding comprising a U-shaped core of magnetic material having a portion of said magnetic windings passing between the arms of said U and adapted to set up a magnetic field when current passes through said windings, the upper portions of the arms of said U being slightly curved to form a pair of magnetic poles, a mounting strap for said core having a pair of slots near the outer end of said strap and adapted to secure said upper portions of said arms in an upright position when said portions are wedged in said slots, an armature member pivotally attached to said mounting strap intermediate the ends of said armature and rotatably operable to vary the magnetic field set up between said poles, spring means for biasing said armature away from said poles, said armature having slots adapted to receive said poles, said armature slots having selectively shaped contours to provide a variable magnetic force between said poles and said armature during rotation of said armature ends towards said poles so that the differential between the armature pulling torque of said field and opposing torque of said spring is substantially constant throughout the path of travel of said armature, and contacts for operatively connecting said starting winding resiliently mounted adjacent said spring means and adapted to be urged into an operative position by movement of said spring means away from said poles.

3. A magnetic control device for starting a dynamo electric machine having a main operating winding and a starting winding comprising a core of magnetic material partially surrounding a portion of said main windings and adapted to set up a magnetic field when current passes through said windings, said core having a pair of outwardly extending poles, an armature member pivotally mounted intermediate the ends thereof and rotatably operable to vary the magnetic field set up between said poles, spring means for biasing said armature away from said poles, said armature having slots adapted to rotatably receive said outwardly extending poles, at least one of said slots having a configuration comprising a square portion and a curved portion constructed and arranged to provide a selectively variable magnetic force between said poles and said armature during rotation of said armature ends toward said poles whereby the differential between the armature pulling torque of said field and opposing torque of said spring is substantially constant throughout the path of travel of said armature, and contacts for operatively connecting said starting winding resiliently mounted adjacent said spring means and adapted to be urged into an operative position by movement of said spring means away from said poles.

4. A magnetic control device for starting a dynamo electric machine having a main operating winding and a starting winding comprising a U-shaped core of magnetic material having a portion of said magnetic windings passing between the arms of said U and adapted to set up a magnetic field when current passes through said windings, the upper portions of the arms of said U being slightly curved to form a pair of magnetic poles, a mounting strap for said core having a pair of slots near the outer end of said strap and adapted to secure said upper portions of said arms in an upright position when said portions are wedged in said slots, said strap having an upwardly extending tab portion along one edge of said strap and attached near the inner end thereof, an armature member pivotally attached to said mounting strap at a point intermediate the ends of said armature and rotatably operable to vary the magnetic field set up between said poles, spring means for biasing said armature away from said poles, said armature having slots adapted to rotatably receive said poles, said armature slots having selectively shaped contours to provide a variable magnetic force between said poles and said armature during rotation of said armature ends towards said poles so that the differentil between the armature pulling torque of said field and opposing torque of said spring is substantially constant throughout the path of travel of said armature, and contacts for operatively connecting said starting winding resiliently mounted to said upwardly extending tab portion of said strap adjacent said spring means and adapted to be urged into an operative position by movement of said spring means away from said poles.

5. A magnetic control device for starting a dynamoelectric machine having a main operating winding and a starting winding comprising a U-shaped core of magnetic material having a portion of said magnetic windings passing between the arms of said U and adapted to set up a magnetic field when current passes through said windings, the upper portions of the arms of said U being slightly curved about their longitudinal axes to form a pair of magnetic poles, a mounting strap for said core having a pair of slots near the outer end of said strap and adapted to secure said upper portions of said arms in an upright position when said portions are wedged in said slots, said strap having an upwardly extending tab portion along one edge of said strap and attached along the inner end thereof, an armature member pivotally attached to said mounting strap at a point intermediate the ends of said armature and rotatably operable to vary the magnetic field set up between said poles, said armature having an outwardly extending projection along one edge, a leaf spring for biasing said armature away from said poles, said leaf spring having a portion bent back upon itself, the smaller end of said bent portion of said spring being adapted to cooperatively engage said projection whereby said spring urges said armature away from said poles, said armature ends having slots therein adapted to rotatably receive said poles, at least one of said slots having a configuration comprising a square portion and a curved portion constructed and arranged to provide a selectively variable magnetic force between said poles and said armature during rotation of said armature ends toward said poles thereby the differential between the armature pulling torque of said field and opposing torque of said spring is substantially constant throughout the path of travel of said armature, and normally open contacts for operatively connecting said starting winding when the current through said main winding increases to a predetermined value, said contacts being resiliently mounted adjacent said spring and adapted to be urged into an operative position by movement of said spring away from said poles, said armature and said contacts being adjusted to disconnect said starting winding when the current through said main winding decreases to a preselected value.

6. A magnetic switch comprising a magnetic core having means for setting up a magnetic field therein, said core having a pair of outwardly extending poles, an armature member pivotally mounted intermediate the ends thereof and rotatably operable to vary the magnetic field set up between said poles, a resilient spring member for biasing said armature away from said poles, said spring member having a portion bent back upon itself, said bent back portion having a free end pivotally connected to an edge of said armature whereby said spring member urges said armature away from said poles, and contacts resiliently mounted adjacent said spring member and adapted to be urged into an operative position by movement of said spring member away from said poles.

7. A magnetic switch comprising a magnetic core having means for setting up a magnetic field therein, said core having a pair of outwardly extending poles, an armature member pivotally mounted intermediate the ends thereof and rotatably operable to vary the magnetic field set up between said poles, a resilient spring for biasing said armature away from said poles, said spring having a bent portion defining first and second spring members, said first spring member having an end pivotally connected to an edge of said armature and disposed lengthwise in abutting relationship with said edge of said armature, and contacts resiliently mounted adjacent said second spring member and adapted to be urged into an operative position by movement of said spring away from said poles.

References Cited in the file of this patent

UNITED STATES PATENTS

| | | |
|---|---|---|
| 649,031 | Young | May 8, 1900 |
| 1,053,340 | Ziegler | Feb. 18, 1913 |
| 1,220,813 | Barrow | Mar. 27, 1917 |
| 2,428,784 | Cole | Oct. 14, 1947 |
| 2,503,493 | Juhasz | Apr. 11, 1950 |
| 2,629,031 | Ballman | Feb. 17, 1953 |
| 2,629,792 | Fitch | Feb. 24, 1953 |

FOREIGN PATENTS

| | | |
|---|---|---|
| 470,649 | Germany | Jan. 26, 1929 |